US012794785B2

(12) United States Patent
Zhou et al.

(10) Patent No.: US 12,794,785 B2
(45) Date of Patent: Nov. 10, 2026

(54) FEDERATED LEARNING FOR WIRELESS COMMUNICATIONS SYSTEMS

(71) Applicant: APPLE INC., Cupertino, CA (US)

(72) Inventors: Zhou Zhou, San Diego, CA (US); Sharad Sambhwani, San Diego, CA (US)

(73) Assignee: APPLE INC., Cupertino, CA (US)

( * ) Notice: Subject to any disclaimer, the term of this patent is extended or adjusted under 35 U.S.C. 154(b) by 121 days.

(21) Appl. No.: 18/734,103

(22) Filed: Jun. 5, 2024

(65) Prior Publication Data

US 2024/0430174 A1 Dec. 26, 2024

Related U.S. Application Data

(60) Provisional application No. 63/510,283, filed on Jun. 26, 2023.

(51) Int. Cl.

| | |
|---|---|
| ***H04L 41/16*** | (2022.01) |
| ***H04L 45/00*** | (2022.01) |
| ***H04W 28/02*** | (2009.01) |

(52) U.S. Cl.

CPC .............. *H04L 41/16* (2013.01); *H04L 45/36* (2013.01); *H04W 28/0215* (2013.01)

(58) Field of Classification Search

CPC ..... H04L 41/16; H04L 45/36; H04W 28/0215

See application file for complete search history.

(56) References Cited

U.S. PATENT DOCUMENTS

| | | | | |
|---|---|---|---|---|
| 12,026,936 | B1 | 7/2024 | Choi et al. | |
| 2020/0026910 | A1 | 1/2020 | Wang et al. | |
| 2020/0213354 | A1 | 7/2020 | Chakraborty et al. | |
| 2023/0082173 | A1* | 3/2023 | Li | G06N 20/00 713/168 |
| 2023/0153522 | A1 | 5/2023 | Cho et al. | |
| 2023/0316062 | A1* | 10/2023 | Balevi | G06N 3/098 706/25 |
| 2023/0367976 | A1 | 11/2023 | Li et al. | |
| 2024/0144009 | A1* | 5/2024 | Mo | G06N 3/09 |
| 2024/0311490 | A1 | 9/2024 | Chan et al. | |
| 2024/0430136 | A1 | 12/2024 | Zhou et al. | |
| 2025/0265500 | A1* | 8/2025 | Krouka | G06N 20/00 |
| 2025/0371370 | A1* | 12/2025 | Keshavamurthy | G06N 3/098 |

OTHER PUBLICATIONS

SPar, S., Shin, D., Chung, J., & Lee, N. (Jun. 19, 2023). FedFwd: Federated Learning without Backpropagation. ICML 2023 Workshop Federate Learning. Retrieved from <https://openreview.net/forum?id=mmT90A4mzF> (Year: 2023).*

Notice of Allowance, Oct. 16, 2025, 10 pages.

* cited by examiner

*Primary Examiner* — Brian J. Gillis

*Assistant Examiner* — Juan C Turriate Gastulo

(74) *Attorney, Agent, or Firm* — Dorsey & Whitney LLP

(57) ABSTRACT

A wireless communication system may use federated learning to develop a global model. The system may initialize parameters of user equipment (UE) models. A network node may select multiple UEs to participate in federated training. The selected UEs may choose one or more model layers to generate local models. The network node may aggregate the local models to generate a global model. The process may be repeated until the global model converges.

20 Claims, 15 Drawing Sheets

FEDERATED LEARNING FOR WIRELESS COMMUNICATIONS SYSTEMS

TECHNICAL FIELD

This application relates generally to wireless communication systems, including modeling of a wireless communication system using forward-forward learning.

BACKGROUND

Wireless mobile communication technology uses various standards and protocols to transmit data between a base station and a wireless communication device. Wireless communication system standards and protocols can include, for example, 3rd Generation Partnership Project (3GPP) Long Term Evolution (LTE) (e.g., 4G), 3GPP New Radio (NR) (e.g., 5G), and Institute of Electrical and Electronics Engineers (IEEE) 802.11 standard for Wireless Local Area Networks (WLAN) (commonly known to industry groups as Wi-Fi®).

As contemplated by the 3GPP, different wireless communication systems' standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, Global System for Mobile communications (GSM), Enhanced Data Rates for GSM Evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements Universal Mobile Telecommunication System (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC) while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

The goals of wireless communication systems include providing reliable, efficient, and secure communication between UEs and network nodes. Artificial intelligence (AI) may be used to assist in meeting these goals. For example, AI technologies can be used in several ways within a wireless system, including network optimization. For instance, AI can be used to optimize the performance of the network by analyzing data, predicting future traffic patterns, and identifying areas of congestion. This can help to improve network efficiency and reduce downtime. Further, AI can be used to automate network operations, such as provisioning, configuration, and optimization. This can help to reduce costs and improve operational efficiency.

Described herein are embodiments using Forward-Forward (FF) learning based procedures that may be applicable to improving wireless network communication systems. Some embodiments apply FF learning based procedures to end-to-end learning based communication systems. Such embodiments may be said to belong to the scope of artificial intelligence (AI) for wireless communications. In some embodiments, wireless communications may apply FF learning to enable a federated learning framework. Such embodiments may be said to fall under the umbrella of wireless communications for AI.

Figure 1:
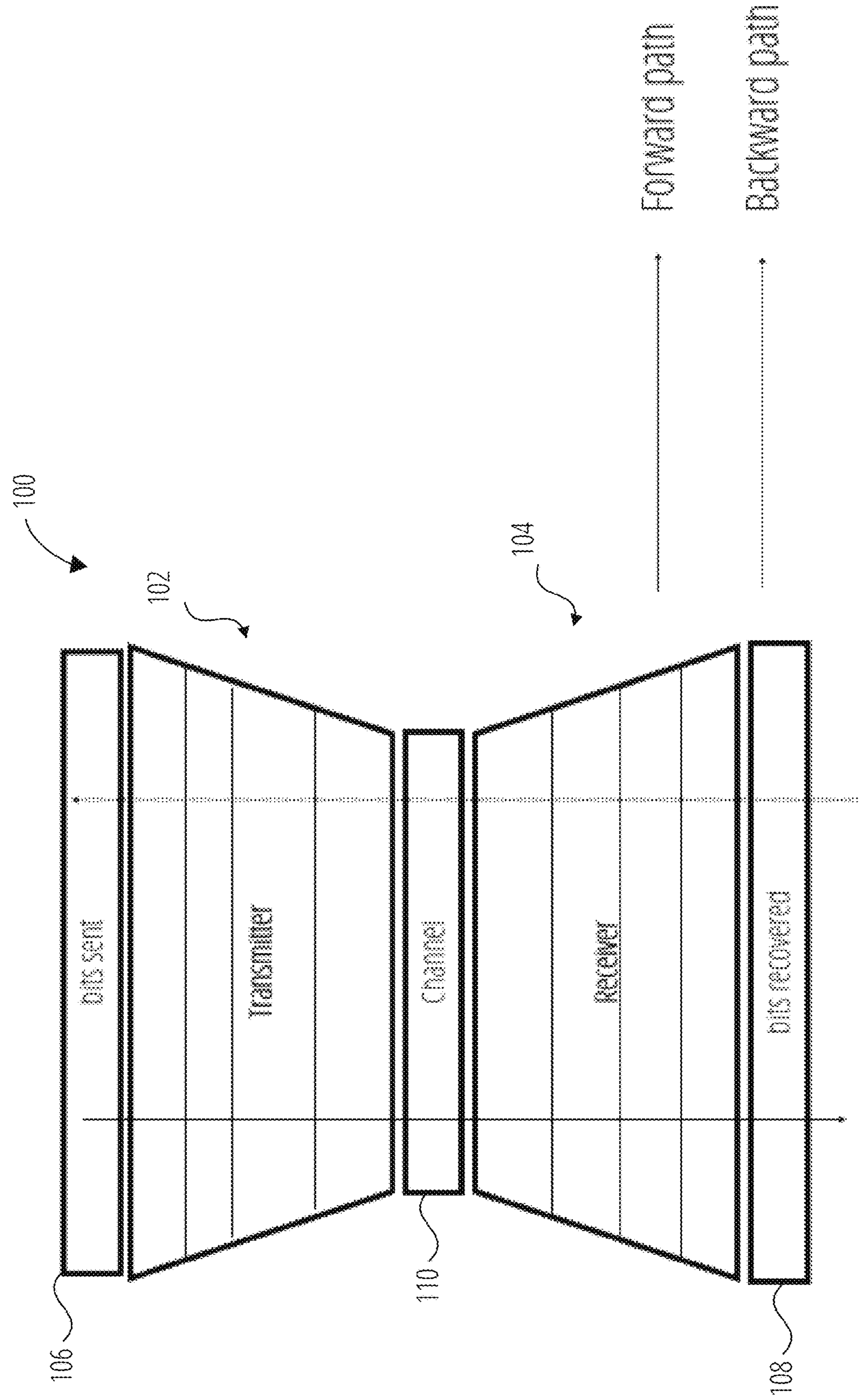
FIG. 1 illustrates an AI training diagram for a wireless communication system using end-to-end learning by back-propagation in accordance with some embodiments.

AI may be trained using various algorithms and procedures. In some wireless communication systems, end-to-end learning by backpropagation may be implemented. FIG. 1 illustrates an AI training diagram 100 for a wireless communication system using end-to-end learning by backpropagation in accordance with some embodiments.

The backpropagation (BP) algorithm (i.e., forward-backward learning) is often considered as the standard algorithm in the training of deep neural networks. Forward-Backward learning requires perfect knowledge of the computation performed in the forward pass in order to compute the correct derivatives. Backpropagation is computationally intensive and requires a large amount of memory to store the gradients and updates, especially for deep networks. This makes the neural network training on memory limited devices unaffordable.

The end-to-end training includes sending data along a forward path through neural network layers of a transmitter 102 and through neural network layers of a receiver 104. For example, as shown in the AI training diagram 100 a transmitter 102 may send a set of bits (i.e., bits sent 106). The bits may be go through the layers of the transmitter, then through a channel 110 of the communication system, and then through the layers of the receiver 104. After the bits have traveled through all the layers of the receiver 104 the bits are considered recovered (i.e., bits recovered 108). The bits are then sent along the backward path from the receiver to the transmitter.

The end-to-end training is used to minimize the loss to match the recovered bits to transmitted ones. For example, the weights of the connections between the neurons of the layers may be adjusted to minimize the error between the bits sent 106 and the bits recovered 108. Once the network is trained, it can be used to make predictions on new data. The transmitter 102 may be either a UE or a network node. Similarly, the receiver 104 may be either a UE or a network node. The end-to-end training is used to model a transmission from either the UE to the network node or the network node to the UE.

The channel may be approximated by a differential model in the training. For example, for the forward path calculation, the following equation may be used.

$$y = R(C(T(x)))$$

where:

y is the output, x is the input to the end-to-end system,

T is the transmitter model,

C is the wireless channel model, and

R is the receiver model.

For the backward path calculation the following equations may be used. In some embodiments, the set of equations may be used in the training stage only.

$$\Delta_R = L'(R(C(T(x))))$$

$$\Delta_T = L'(R(C(T(x)))) * R'(C(T(x))) * C'(T(x))$$

$$R = R - \lambda\Delta_R$$

$$T = T - \lambda\Delta_T$$

where:

L stands for training loss function,

T is the transmitter model,

C is the wireless channel model, and

R is the receiver model.

As shown by these equations, to update the receiver via backpropagation, a differential model of the channel may be needed.

However, there are problems with using backpropagation based end-to-end learning. For example, there may be a channel layer issue. If a system uses backpropagation-based training, the gradient of wireless channels has to be precisely approximated via differentiable models analytically or via learning based approaches which bring extra costs on dataset collection and computational resources.

Additionally, there may be a backpropagation learning issue. When a wireless system is integrated with multiple neural components, it equivalently forms a deep neural network. Accordingly, backpropagation may suffer from vanishing gradient issues, where the gradients become very small and prevent the network from learning, or the exploding gradient problem, where the gradients become very large and cause the network to diverge.

Some systems have attempted to solve these issues. For example, regarding the channel layer issue, a system may model the channel by a neural network to obtain a channel layer gradient, such as using a generative neural network to approximate the channel distribution. However, this may require large dataset collection efforts (channel measurements). Reinforcement learning may be used for the training of the transmitter therefore avoiding the back-propagation through the channel. However, this option may lead to a slower convergence rate, which means requiring significantly higher overhead on the feedback.

In some solutions to the vanishing gradients in deep neural network training issue, a system may add skip connections across layers, such as a residual network (ResNet). However, it may take more efforts on optimizing the neural network structure. For instance, it may take longer to determine which layers to skip.

To reduce some of the problems associate with backpropagation, a wireless communication system end-to-end AI model may be trained using Forward-Forward learning. Forward-Forward learning may be used to replace the forward and backward passes of backpropagation.

Forward-Forward learning has two forward passes for model training, one with a positive dataset and the other with a negative dataset. In Forward-Forward learning, each layer in the end-to-end system uses its own objective function by maximizing a goodness function for positive data and minimizing a goodness function for negative data. After the two forward passes have been completed, the Forward-Forward algorithm may update the weights of the neural network.

The weights are updated in such a way that they increase the goodness of the positive data and decrease the goodness of the negative data.

The Forward-Forward algorithm in some configurations may be much faster in speed compared with backpropagation. In the worst case, it is comparable in speed to backpropagation but has the advantage that it can be used when the precise details of the forward computation are unknown.

Figure 2:
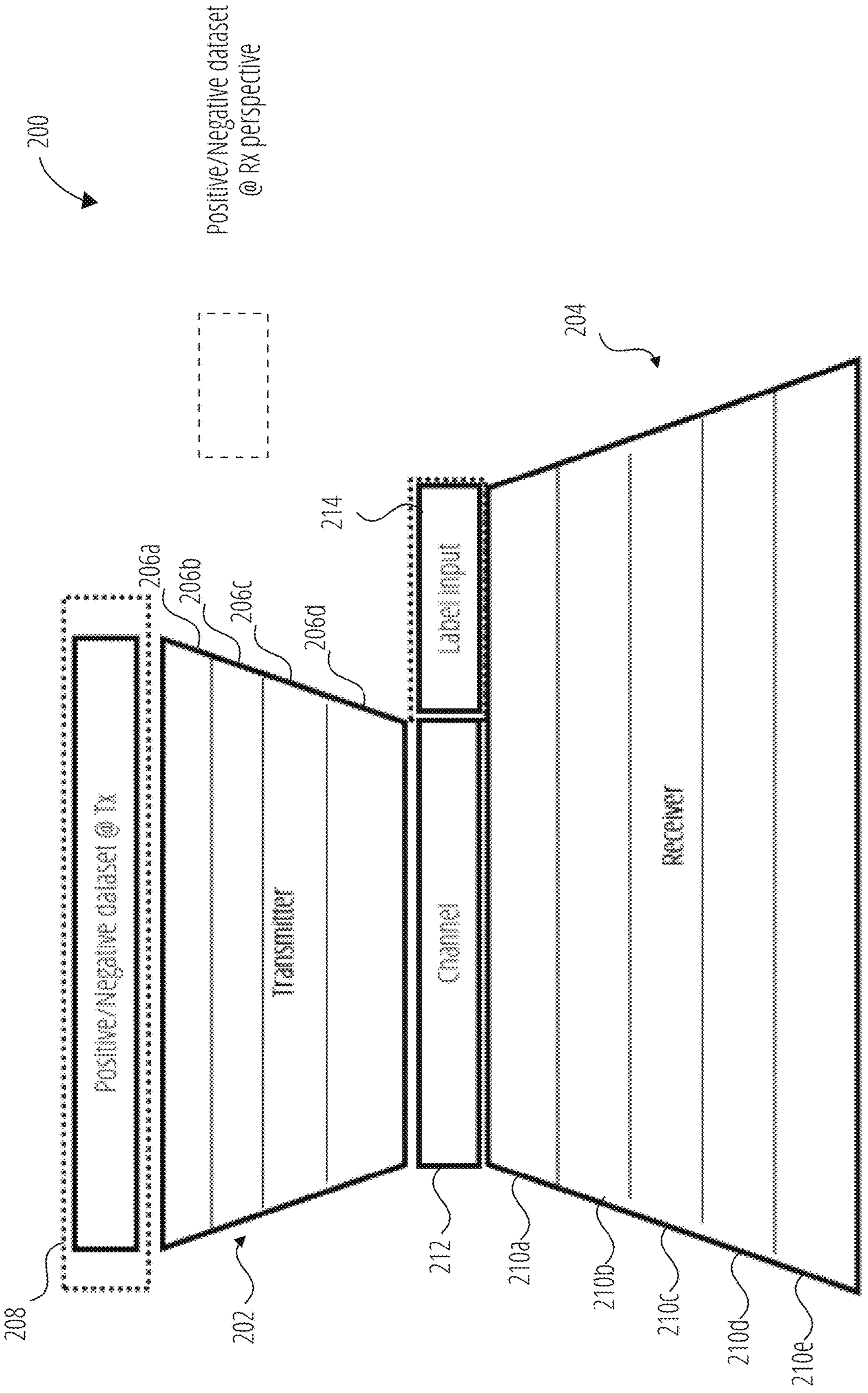
FIG. 2 illustrates an AI training diagram for a wireless communication system using end-to-end learning by Forward-Forward learning in accordance with some embodiments.

FIG. 2 illustrates an AI training diagram 200 for a wireless communication system using end-to-end learning by Forward-Forward learning in accordance with some embodiments. End-to-end learning refers to AI modeling of the wireless communication system across the transmitter 202 and the receiver 204. Once the network is trained, it can be used to make predictions on new data. The transmitter 102 may be either a UE or a network node. Similarly, the receiver 104 may be either a UE or a network node. The end-to-end training is used to model a transmission from either the UE to the network node or the network node to the UE.

The end-to-end learning by Forward-Forward learning can provide layerwise training. The Forward-Forward learning may be used to train each transmitter layer 206*a*-206*d* and each receiver layer 210*a*-210*e*. Forward-Forward learning can maximize for positive datasets and minimize for negative datasets the goodness function defined on each layer.

In some embodiments, the end-to-end learning may use a Forward-Forward algorithm. Suppose a neural network with K layers, (not limited to an end-to-end system). The training process may be as follows. First, a system may perform a first Forward path calculation at Layer k: $y_p=k(x_p)$, where $y_p$ is the output corresponding to its input $x_p$, namely the positive dataset. Second, the system may perform a second Forward path calculation at Layer k: $y_n=k(x_n)$, where $y_n$ is the output corresponding to its input $x_n$, namely the negative dataset. Third, the system may update the coefficients on the layer k by maximizing $f(y_p)-f(y_n)$ where f is called the goodness function. Fourth, the system may sequentially conduct the training from the first layer to the last layer except the layers which cannot be trained.

Figure 3:
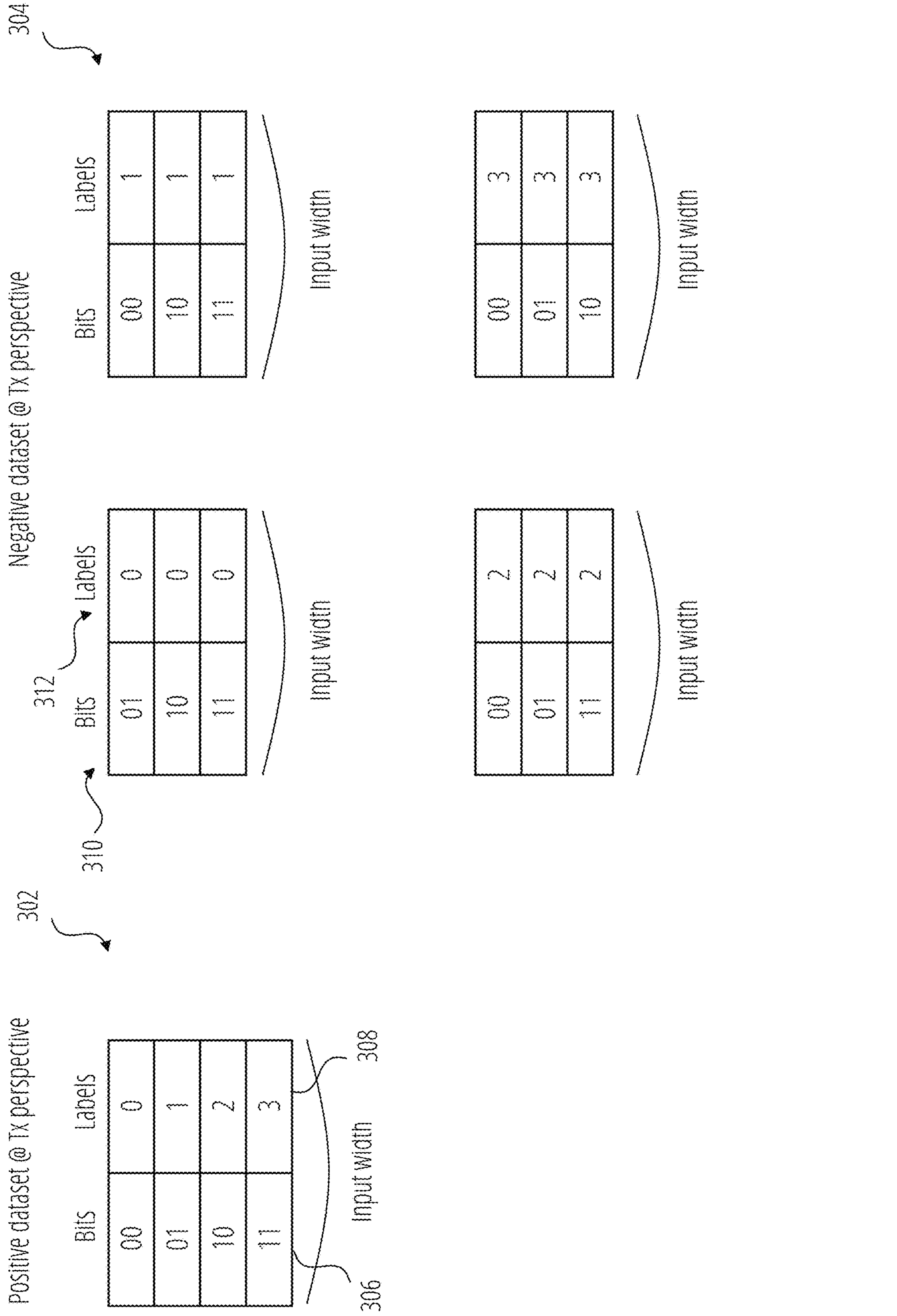
FIG. 3 illustrates a positive dataset and a negative dataset at the transmitter in accordance with some embodiments.

The training dataset 208 for the transmitter 202 may include a positive dataset and a negative dataset. FIG. 3 illustrates a positive dataset 302 and a negative dataset 304 at the transmitter 202 in accordance with some embodiments. The positive dataset 302 has information that a discriminative model can use for a classification task training. On the other hand, the negative dataset 304 only contains the information which can completely fool a discriminative model.

For instance, in an end-to-end communication system where the transmission is based on 2-bits length blocks, the definition of positive dataset 302 and the negative dataset 304 at transmitter may be as shown in FIG. 3. The positive dataset 302 in the illustrated embodiment includes four entries. Each entry includes a 2-bit length block 306 and a corresponding label 308. In the positive dataset 302, the labels 308 correctly correspond to the value of the 2-bit length blocks 306. Note that other lengths of blocks may be used (e.g., 3-bit, 4-bit, etc.). The negative dataset 304 in the illustrated embodiment also includes 2-bit length blocks 310 and corresponding labels 312. However, in contrast to the positive dataset 302, the labels 312 of the negative dataset 304 are not equal to the value of the 2-bit length blocks 306.

Returning to FIG. 2, both the positive dataset and the negative dataset are feed through each layer of the transmitter 202 to train each layer. When the positive dataset is the input, the layer maximizes the goodness function. When a negative dataset is input, the layer minimizes the goodness function.

The positive dataset is transmitted over the channel 212. By transmitting the positive dataset and not the negative dataset, channel resources may be conserved. Instead of receiving a negative dataset, the receiver 204 may generate its own negative dataset.

For example, the receiver 204 may receive the transmitter's positive dataset and use the transmitter's positive dataset to generate a receiver positive dataset and a receiver negative dataset for training the receiver layers 210*a*-210*e*. For example, a label input 214 may append a second set of labels to the transmitter's positive dataset to generate a second positive and negative dataset for the receiver. In some embodiments, the label input 214 may be provided by or controlled by the receiver 204. For example, the receiver 204 may comprise a label input node that concatenates a second label set to the positive dataset from the transmitter.

Figure 4:
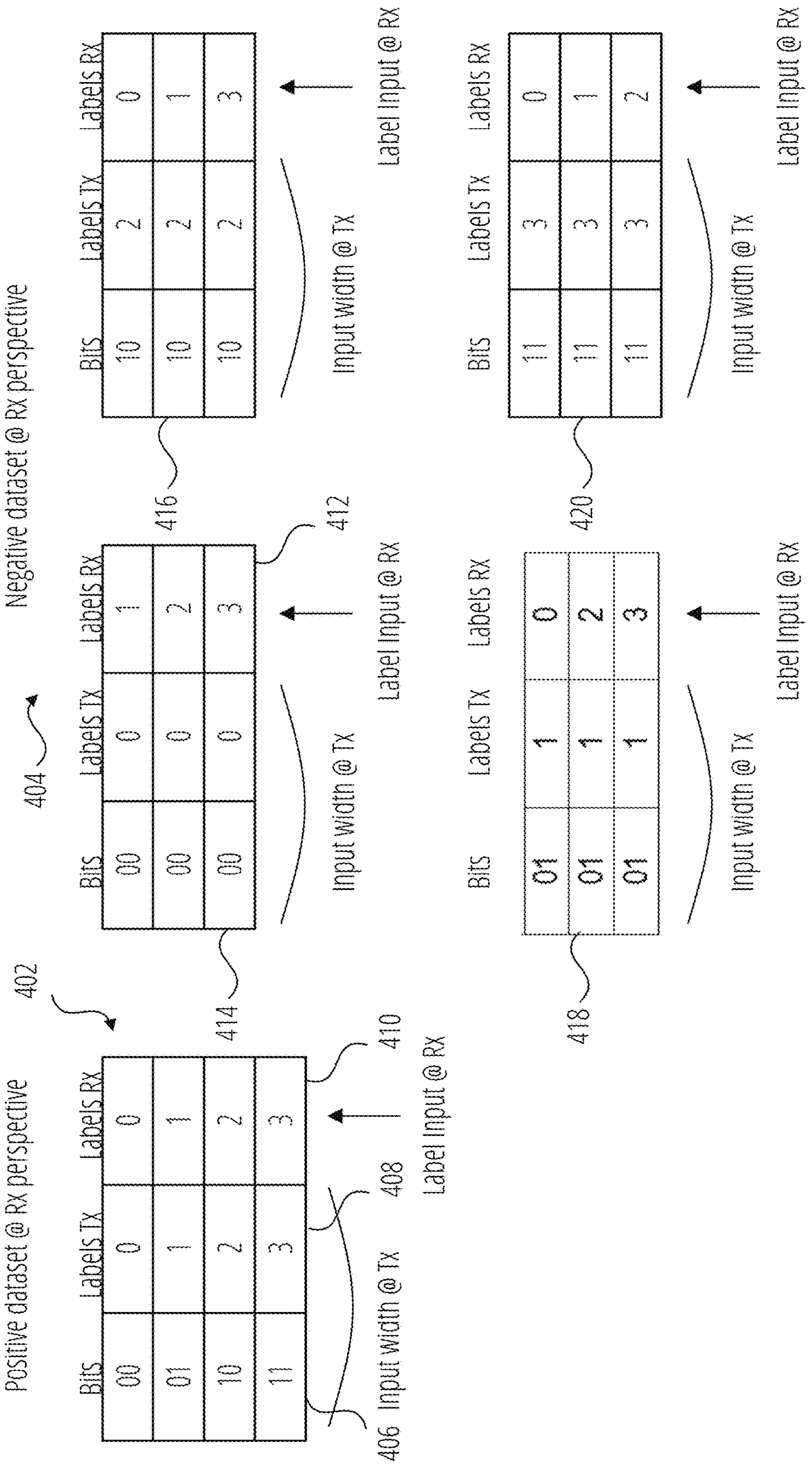
FIG. 4 illustrates a positive dataset and a negative dataset from the perspective of the receiver in accordance with some embodiments.

FIG. 4 illustrates a positive dataset 402 and a negative dataset 404 from the perspective of the receiver (e.g., receiver 204). As can be seen, the positive dataset 402 may include the set of two-bit length blocks 406 and the corresponding labels 408 from a positive dataset sent by the transmitter (e.g., transmitter 202). The receiver may append a second set of labels 410 to the bit blocks. The second set of labels 410 correctly match the value of the bits and the labels 408 from the transmitter.

The receiver may also generate the negative dataset 404 from the positive dataset sent by the transmitter by appending another set of labels (e.g., labels 412). In contrast to the positive dataset 402, the labels for the negative dataset do not match the value of the bits or the labels from the transmitter. For example, in a first negative dataset 414, the bits may be set to a value of zero, the labels from the transmitter may have the correct value of the bits, and the receiver may introduce a new set of labels that includes false values. The false set of labels may include the other possible values of the bits and omit the actual value. Similarly, a second negative dataset 418 may have bits set to a value of one, the labels from the transmitter may have the correct value of the bits, and the receiver may introduce a new set of labels that includes false values. A third negative dataset 416 may have bits set to a value of two, the labels from the transmitter may have the correct value of the bits, and the receiver may introduce a new set of labels that includes false values. A fourth negative dataset 420 may have bits set to a value of three, the labels from the transmitter may have the correct value of the bits, and the receiver may introduce a new set of labels that includes false values.

More datasets may be used for the negative datasets 404 if more bits are used. The illustrated embodiment includes negative datasets 404 for each possible value. In each negative dataset 404 the bits may be set to a single value for each entry. There may be sufficient bit entries for the receiver to input labels corresponding to the other possible values of the bits.

The positive dataset 402 and negative dataset 404 may be fed through the layers (layer by layer) of the receiver to train the receiver layers (e.g., receiver layers 210*a*-210*e*). When the positive dataset is input in a layer, the layer maximizes the goodness function. When a negative dataset is input in a layer, the layer minimizes the goodness function.

Figure 5:
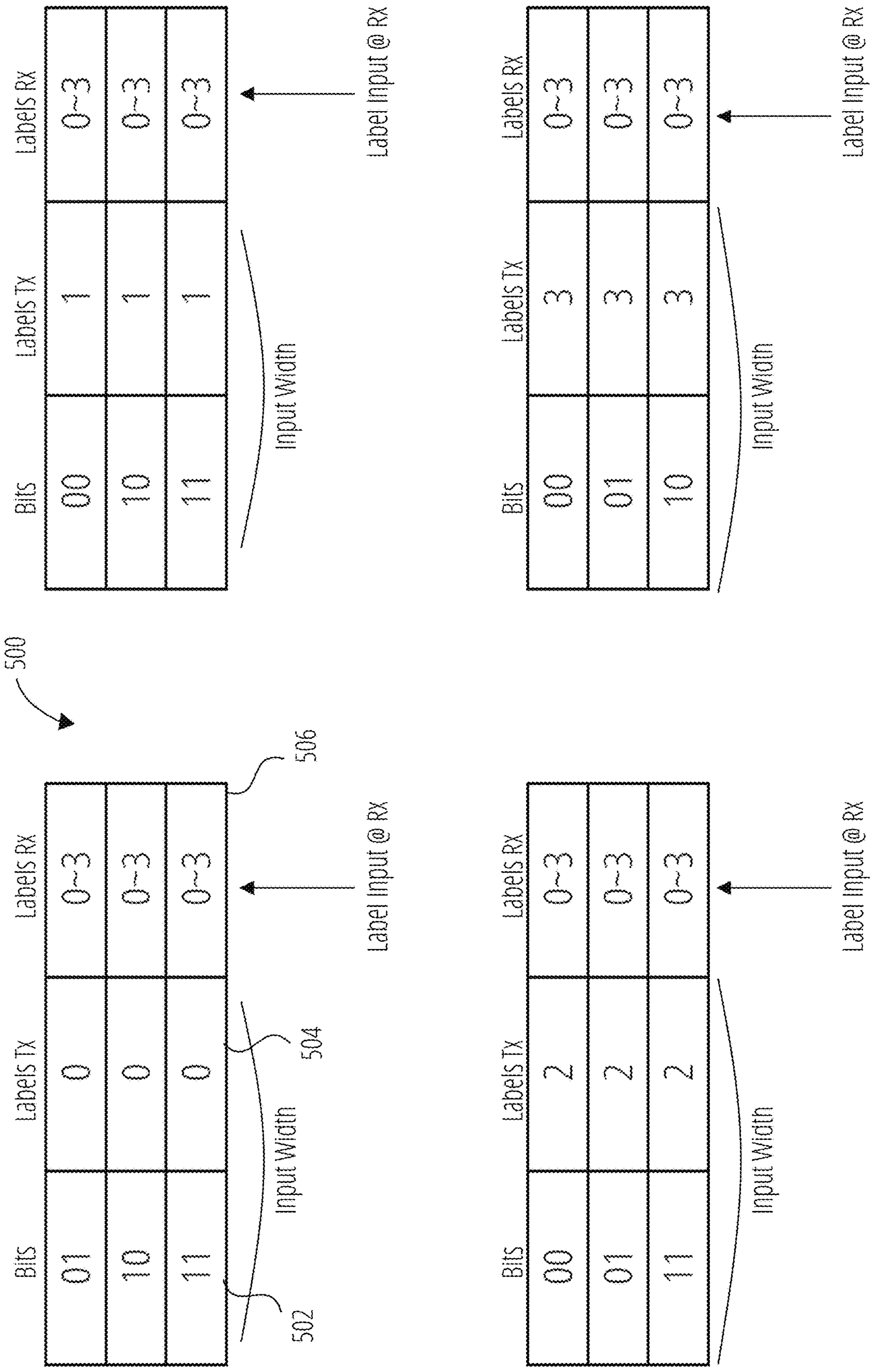
FIG. 5 illustrates invalid datasets in accordance with some embodiments.

FIG. 5 illustrates invalid datasets 500 in accordance with some embodiments. The illustrated combinations (e.g., bits 502, Tx labels 504, and Rx labels 506) creating the invalid datasets 500 are also considered as negative datasets from the receiver's perspective, because as shown the Tx labels 504 are incorrect and in some cases the Rx labels 506 are incorrect. However, in some embodiments the invalid datasets 500 may not be used at the receiver for receiving training, because negative datasets from the transmitter may not be sent over the channel to the receiver.

Figure 6:
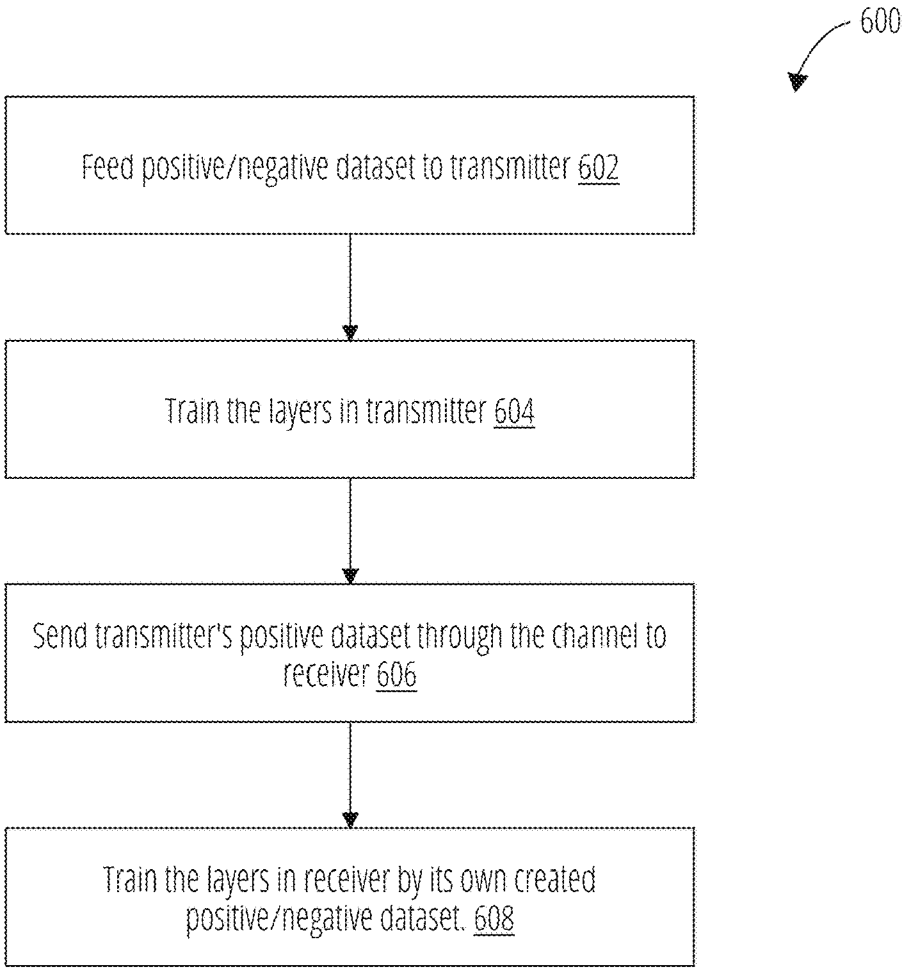
FIG. 6 illustrates a flow chart of a method for training an end-to-end AI model in a wireless communication system in accordance with some embodiments.

FIG. 6 illustrates a flow chart of a method 600 for training an end-to-end AI model in a wireless communication system in accordance with some embodiments. As shown, a model training system may feed 602 positive and negative datasets to a transmitter. The positive and negative datasets for the transmitter may be generated as described with reference to FIGS. 2-5.

The positive and negative datasets may be fed through the transmitter layer by layer. Where the positive and negative datasets are first sent through a first layer, and the output of the first layer is sent to a second layer. The output of each layer of the transmitter may be used as the input of the next layer.

The transmitter may train 604 each of the layers of the transmitter. Each layer of the transmitter may be trained sequentially from the first to the last, where a layer may be considered to be any trainable component in the transmitter. When a positive dataset is the input, the layer maximizes the goodness function. When a negative dataset is input, the layer minimizes the goodness function. The goodness function can be defined in different ways to indicate the neural network activities. For instance, the energy of activations in each layer can be defined as its goodness function.

The transmitter may send 606, via a wireless channel, an output (e.g., the output from a final layer in the transmitter) which corresponds to a positive dataset input. The receiver may receive the output corresponding to the positive dataset input. The transmitter may discard outputs corresponding to negative dataset inputs, and not send such outputs through the channel. By sending positive dataset outputs and not negative dataset outputs, channel resources may be conserved and transmitter/receiver energy consumption may be reduced.

The receiver may train 608 each of the layers of the receiver. The receiver may generate positive and negative datasets from the positive dataset sent from the transmitter as discussed with reference to FIGS. 2-5. The receiver created positive and negative datasets may be used to train 608 each of the layers of the receiver. For example, the receiver may receive the signals from channel and train each layer of the receiver sequentially based on the positive/negative dataset defined for the receiver.

In some embodiments, the receiver's negative dataset is defined on top of the transmitter's positive dataset. To build the receiver's own dataset, there may be synchronization between the receiver and the transmitter, and the knowledge of the bit sequence sent by the transmitter. For example, the transmitted positive dataset may follow a predefined bit sequence. The bit sequence may be defined in a specification, over a control channel, and/or a reference signal.

Figure 7:
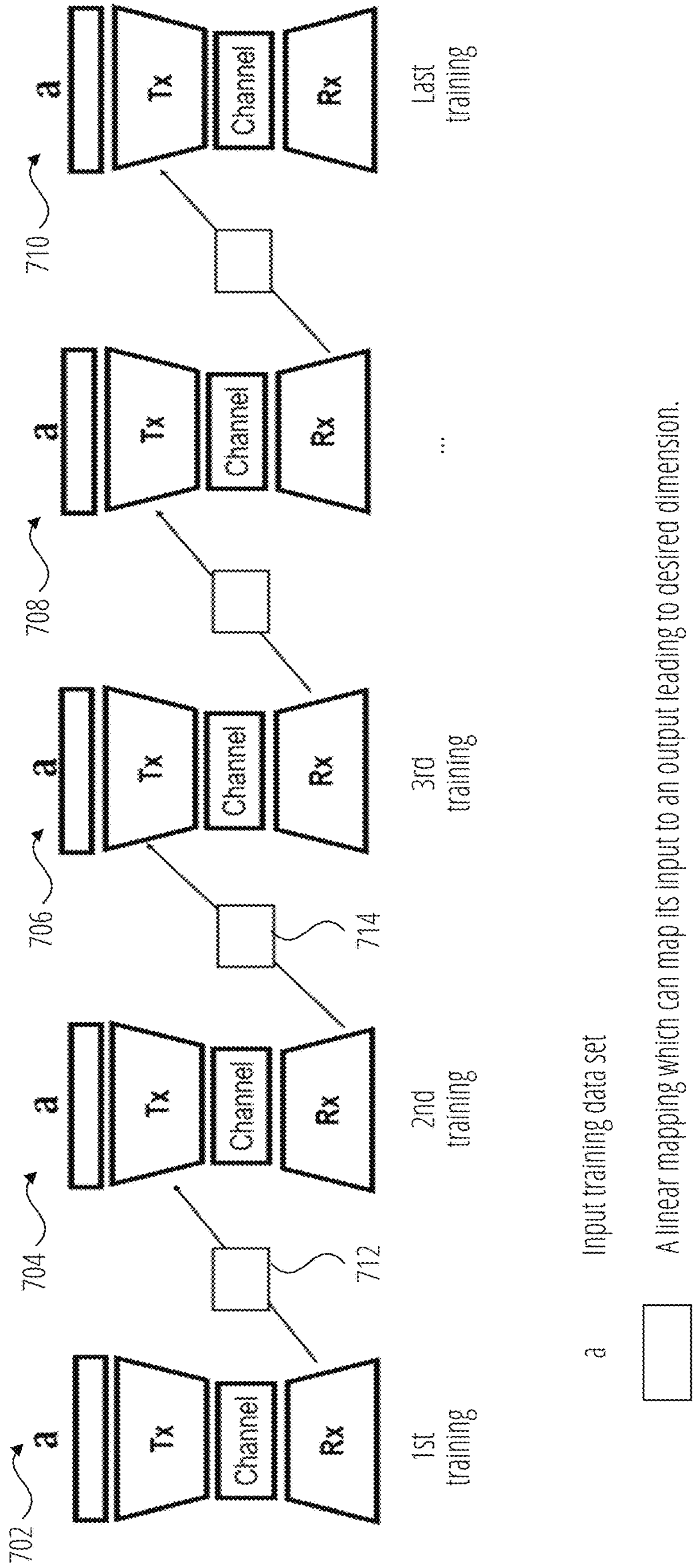
FIG. 7 illustrates a block diagram of an end-to-end learning procedure that uses feedback signals in accordance with some embodiments.

FIG. 7 illustrates a block diagram of an end-to-end learning procedure that uses feedback signals in accordance with some embodiments. To train an AI model, a wireless communication system may use a feedback free scheme using the method 600 described with reference to FIG. 6. Returning to FIG. 7, in some embodiments a training framework may use feedback signals.

Using the feedback signals may allow for further optimization for the transmitter since it can leverage the channel impacts to the training. For example, during a first training 702, an input training dataset may be fed through the layers of the transmitter and receiver. The input training dataset may be generated as discussed with reference to FIGS. 2-5. After the first training 702, a feedback signal 712 is sent from the receiver to the transmitter. The feedback signal 712 may include a linear mapping which can map the input to an output thereby leading to a desired dimension.

A second training 704 may occur by inputting the same training dataset as the first training 702, and adding the feedback signal 712 to a layer of the transmitter. The training dataset is feed through all the layers layer by layer until another feedback signal 714 is generated and sent to the transmitter. The training may occur multiple times (e.g., third training 706, fourth training 708, and last training 710) across a period of time. After each training, feedback from the receiver may be used to provide a dimension adjustment mapping to the transmitter which may be added to any layer of the transmitter. The process may be repeated until convergence is reached, and the values do not change.

Figure 8:
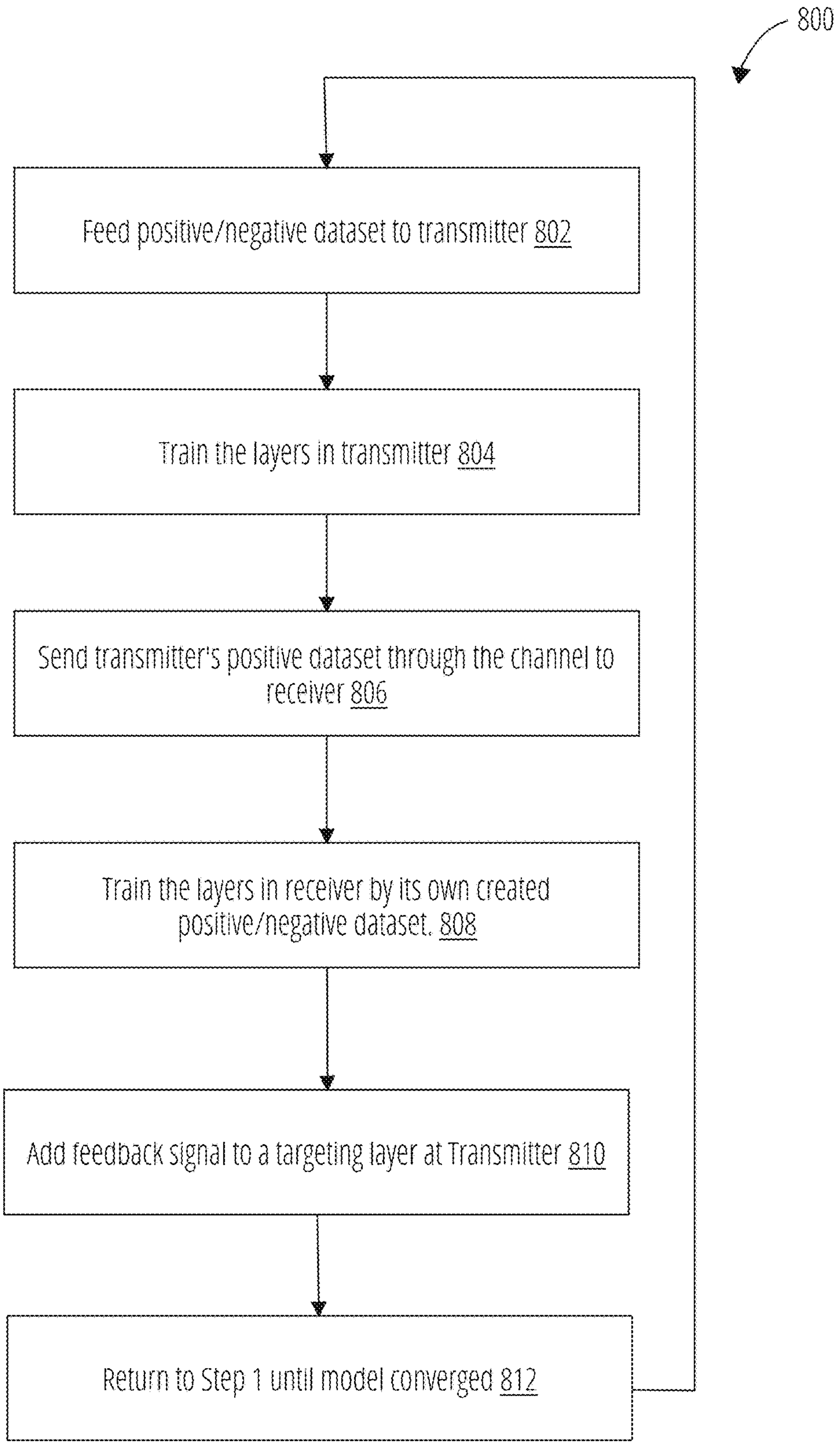
FIG. 8 illustrates a flow chart of a method for training an end-to-end AI model in a wireless communication system with feedback signals in accordance with some embodiments.

FIG. 8 illustrates a flow chart of a method 800 for training an end-to-end AI model in a wireless communication system with feedback signals in accordance with some embodiments. As shown, a model training system may feed 802 positive and negative datasets to a transmitter. The positive and negative datasets for the transmitter may be generated as described with reference to FIGS. 2-5.

The positive and negative datasets may be fed through the transmitter layer by layer. Where the positive and negative datasets are first sent through a first layer, and the output of the first layer is sent to a second layer. The output of each layer of the transmitter may be used as the input of the next layer.

The transmitter may train 804 each of the layers of the transmitter. Each layer of the transmitter may be trained sequentially from the first to the last, where a layer may be considered to be any trainable component in the transmitter. When a positive dataset is the input, the layer maximizes the goodness function. When a negative dataset is input, the layer minimizes the goodness function. The goodness function can be defined in different ways to indicate the neural network activities. For instance, the energy of activations in each layer can be defined as its goodness function.

The transmitter may send 806, via a wireless channel, an output (e.g., the output from a final layer in the transmitter) which corresponds to a positive dataset input. The receiver may receive the output corresponding to the positive dataset input. The transmitter may discard outputs corresponding to negative dataset inputs, and not send such outputs through the channel. By sending positive dataset outputs and not negative dataset outputs, channel resources may be conserved and transmitter/receiver energy consumption may be reduced.

The receiver may train 808 each of the layers of the receiver. The receiver may generate positive and negative datasets from the positive dataset sent from the transmitter as discussed with reference to FIGS. 2-5. The receiver created positive and negative datasets may be used to train 808 each of the layers of the receiver. For example, the receiver may receive the signals from channel and train each layer of the receiver sequentially based on the positive/negative dataset defined for the receiver.

In some embodiments, the receiver's negative dataset is defined on top of the transmitter's positive dataset. To build the receiver's own dataset, there may be synchronization between the receiver and the transmitter, and the knowledge of the bit sequence sent by the transmitter. For example, the transmitted positive dataset may follow a predefined bit sequence. The bit sequence may be defined in a specification, over a control channel, and/or a reference signal.

The receiver may send a feedback signal to the transmitter. The transmitter may add 810 the feedback signal to a targeting layer at the transmitter. For example, the receiver may feedback the receiver layers' activations to the transmitter after a dimension adjustment mapping. The dimension adjustment mapping is defined as a fixed linear mapping which can transform the receiver activations to the same dimension as a targeting layer in the transmitter.

When the transmitter receives feedback from the receiver, the transmitter may directly add the feedback to a layer in the transmitter. The layer that the transmitter adds the feedback to may be referred to as a targeting layer. If the targeting layer is closer to the input, it indicates more trainings will be performed in the transmitter again. If the targeting layer is closer to the output, it indicates that fewer trainings will be performed in the transmitter again.

At the transmitter, the transmitter may train the layer that includes the updated activations and the layers following that layer. At the receiver, the receiver may train all the layers again. The method 800 may repeat 812 the steps until the model converges. The model may be said to converge when the feedback values do not change. The feedback may provide new weights for the layers that may be used in iterative training sessions. The use of feedback may allow the model to be more adaptive to environmental changes.

Figure 9:
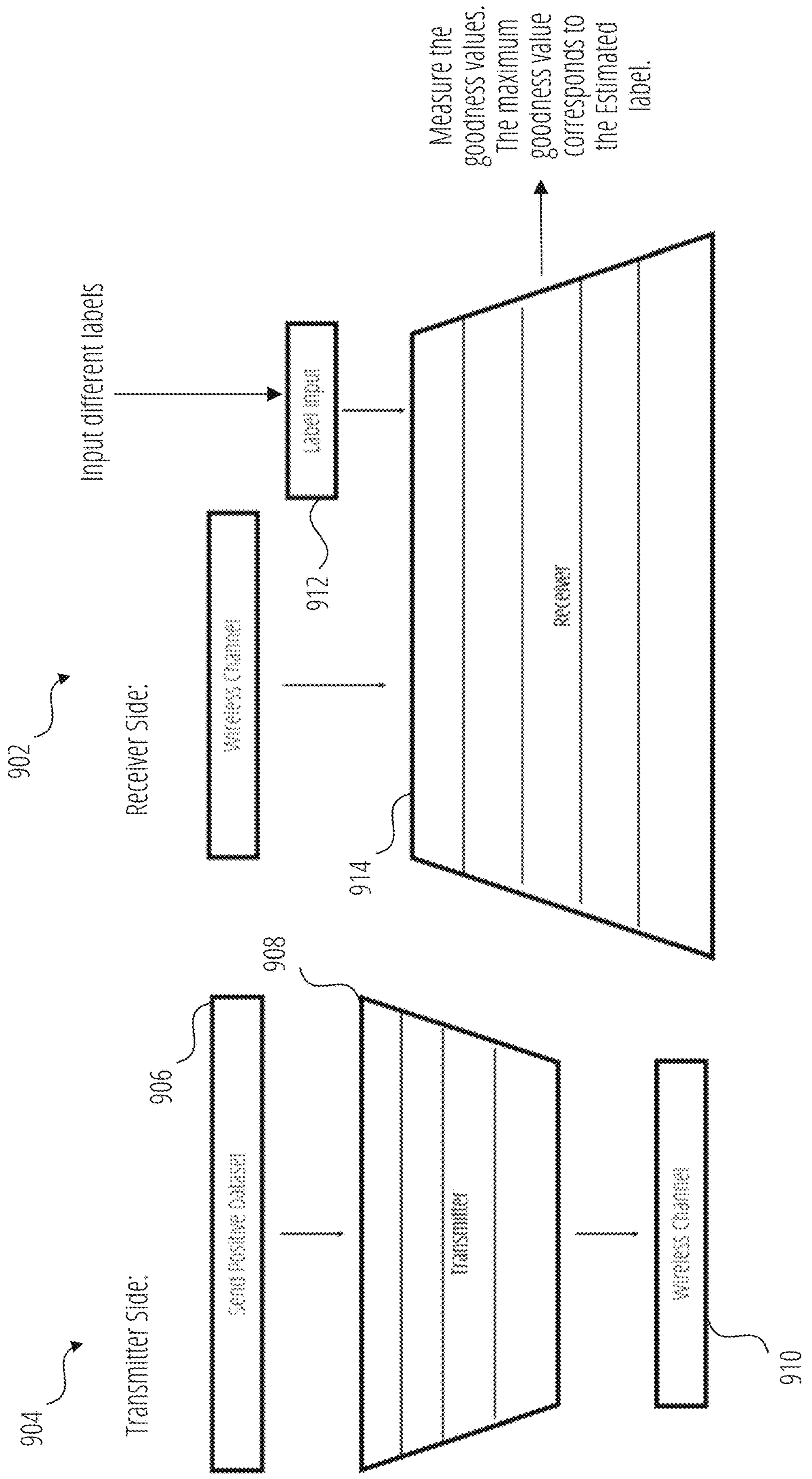
FIG. 9 illustrates a block diagram of a framework for a receiver to infer a dataset based on the model training in accordance with some embodiments.

FIG. 9 illustrates a block diagram of a framework for a receiver 902 to infer a dataset based on the model training in accordance with some embodiments. The inference stage may be conducted by sending the signals from transmitter 904. Then receiver 902 processes the received signals using the goodness models of the receiver's layers to accomplish the communications.

In the illustrated embodiment, the transmitter 904 only sends a positive dataset 906. In some embodiments, a minimum transmission block is defined as each row in the dataset table. For example, in FIG. 3 the minimum transmission block of the table of the positive dataset 302 would be the 2-bit length block 306 and a corresponding label 308 of each row. The transmission block of the positive dataset 906 is sent through the transmitter layers 908 and over the wireless channel 910 to the receiver 902.

When the receiver 902 obtains a minimum transmission block from the wireless channel 910, the receiver 902 combines different labels (e.g., receiver's label input 912) with the transmission block. The receiver 902 feeds the different labels and the transmission block through each of the receiver layers 914. The receiver measures the goodness values associated with the transmission block from the transmitter 904 and the labels. The receiver 902 detects a label corresponding to its maximum goodness value, which is considered as the maximum likelihood estimation to the transmitted information. The maximum goodness value corresponds to the estimated label.

Figure 10:
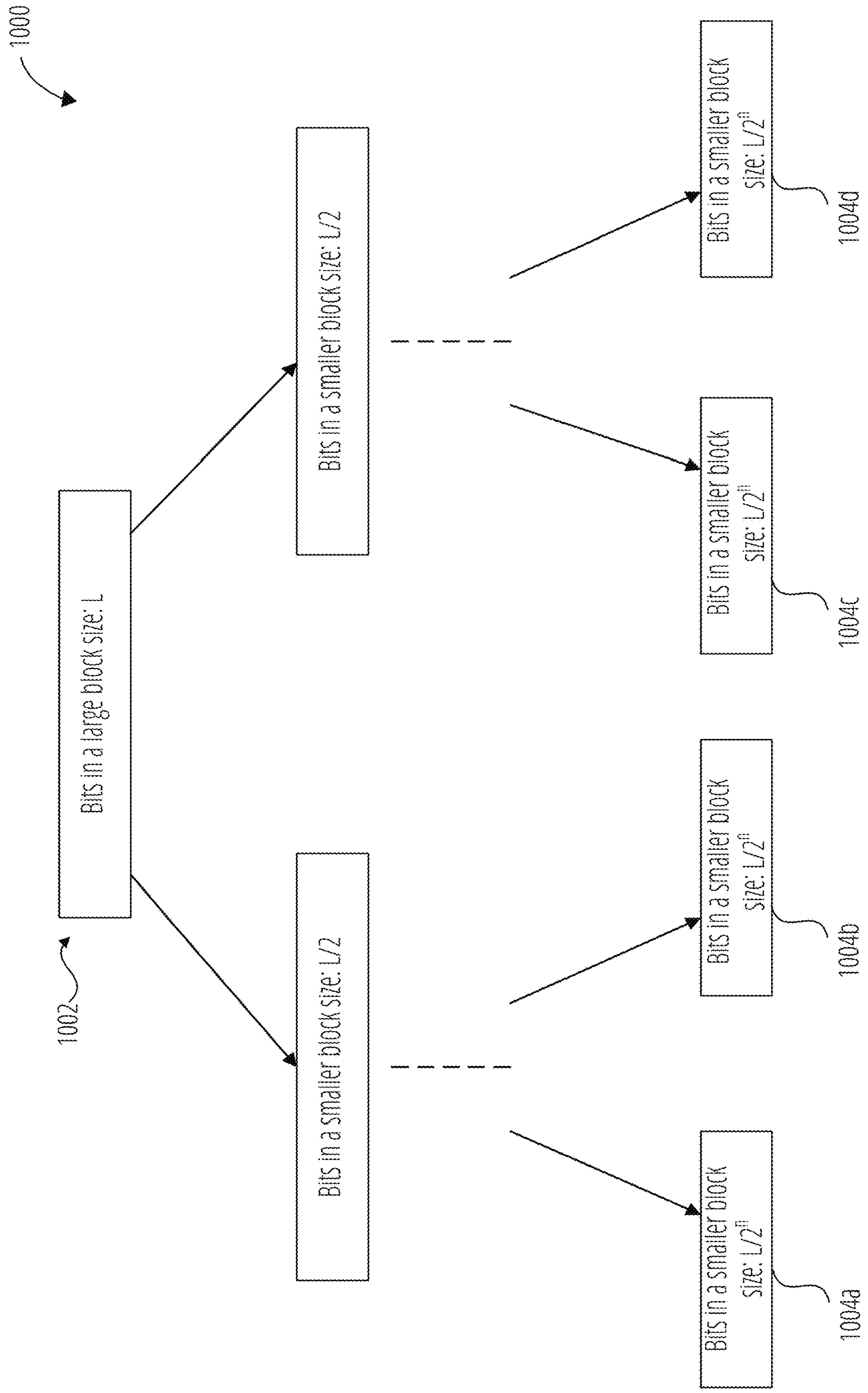
FIG. 10 illustrates a block diagram of a framework for a wireless communication model training and inference using sub-blocks in accordance with some embodiments.

FIG. 10 illustrates a block diagram of a framework 1000 for a wireless communication model training and inference using sub-blocks in accordance with some embodiments. The illustrated framework 1000 may be used to reduce the blocks size for computation efficiency for either training or inferences.

If the bits block size is defined, the training/inference procedures at the receiver may be conducted on sub-blocks which may be obtained by a tree-structure based dividing process. For instance, a large block 1002 can be divided into 2" sub-blocks (e.g., sub-block 1004*a*, sub-block 1004*b*, sub-block 1004*c*, and sub-block 1004*d*). Training/inference procedures may be done on each sub-block for the receiver. In some embodiments, the positive/negative dataset for training may also be obtained by the corresponding division. The division into sub-blocks enables parallelization of the training/inference process. The sub-blocks may be processed for training or for inference as discussed with reference to FIGS. 1-9.

Using forward-forward end-to-end learning for wireless communication systems may result in a more computational efficient method of training than end-to-end learning by backpropagation. Forward-forward learning may be used to train an end-to-end learning based wireless communication system without obtaining any knowledge/model of the wireless channel. This is because forward-forward learning may not need to model the channel and channel gradients like a backpropagation based system. In some embodiments, the reference signal used for training is not for explicit channel estimation but for forward-forward training.

Some embodiments herein may train any given layer in an end-to-end learning based wireless communication system without storing gradient information of any other layers. For example, embodiments may use coefficients for each layer and not use gradients because forward-forward learning does not rely on such gradients. Embodiments may train an end-to-end learning based wireless communication system following the same order of the communication process (sequentially from the transmitter to receiver.) This is contrary to conventional backpropagation based learning in wireless communications systems, where the updates are performed in a reverse order to communication process.

In some embodiments, there is no explicit output in the receiver to conduct the training/inference. The training and inference may be based on measuring the activations of receiver's layers.

The transmitter may only send a portion of the entire training dataset to the receiver. For example, the transmitter may only the positive dataset over the channel for the training of receiver. The training dataset for the receiver may be created by the received signals from the channel with an auxiliary input.

In some embodiments, the receiver or the transmitter may alter a number of layers to be trained based on a wireless communication link metric. Forward-forward learning may allow devices to partially train a few layers of the neural network, based on wireless communication link/system level metrics, such as SNR, CQI, RSRP. For instance, if SNR is greater than a threshold, the system may train more/less than K layers of the neural network. Else if, SNR is less than the threshold, the system may train less/more than K layers of the neural network. In some instances, this may be done to prevent noise, increase accuracy at certain metrics, reduce latency, and/or increase computational efficiencies.

The layer-by-layer based training may allow the transmitter and receiver to adapt their complexity of training by adding or removing, or freezing or activating a few layers. In some instances, this may be done to prevent noise, increase accuracy at certain metrics, reduce latency, and/or increase computational efficiencies. Every layer in the neural network or trainable components can have its individual goodness function. The training data can be defined to have multiple levels rather than "positive and negative" only. For a dataset with multiple levels, the levels can represent communication metrics, such as SNRs in a MCS table. Accordingly, the system may optimize the goodness function at different SNRs or other levels.

The training of transmitter can be uncoupled or coupled with the wireless channel based on whether feedback signal is added. If the training of transmitter is coupled with wireless channels, a feedback signal may be sent from the receiver, then combined with a targeting layer at the transmitter. The feedback signal may be constructed by applying a fixed linear mapping to activations of the receiver. The feedback can be combined with the activation of any layer in the transmitter.

The training may use synchronization between transmitter and receiver. For example, the receiver may know the bit sequence sent by the transmitter. The transmitter can send the information based on a lookup table that maps a group-of-bits to a label.

In some embodiments, the training/inference stage at the receiver can be conducted in a tree-structure based searching enabling a parallelization of the training/inference process. This may reduce the complexity and improve the performance of the device for training or inference.

Figure 11:
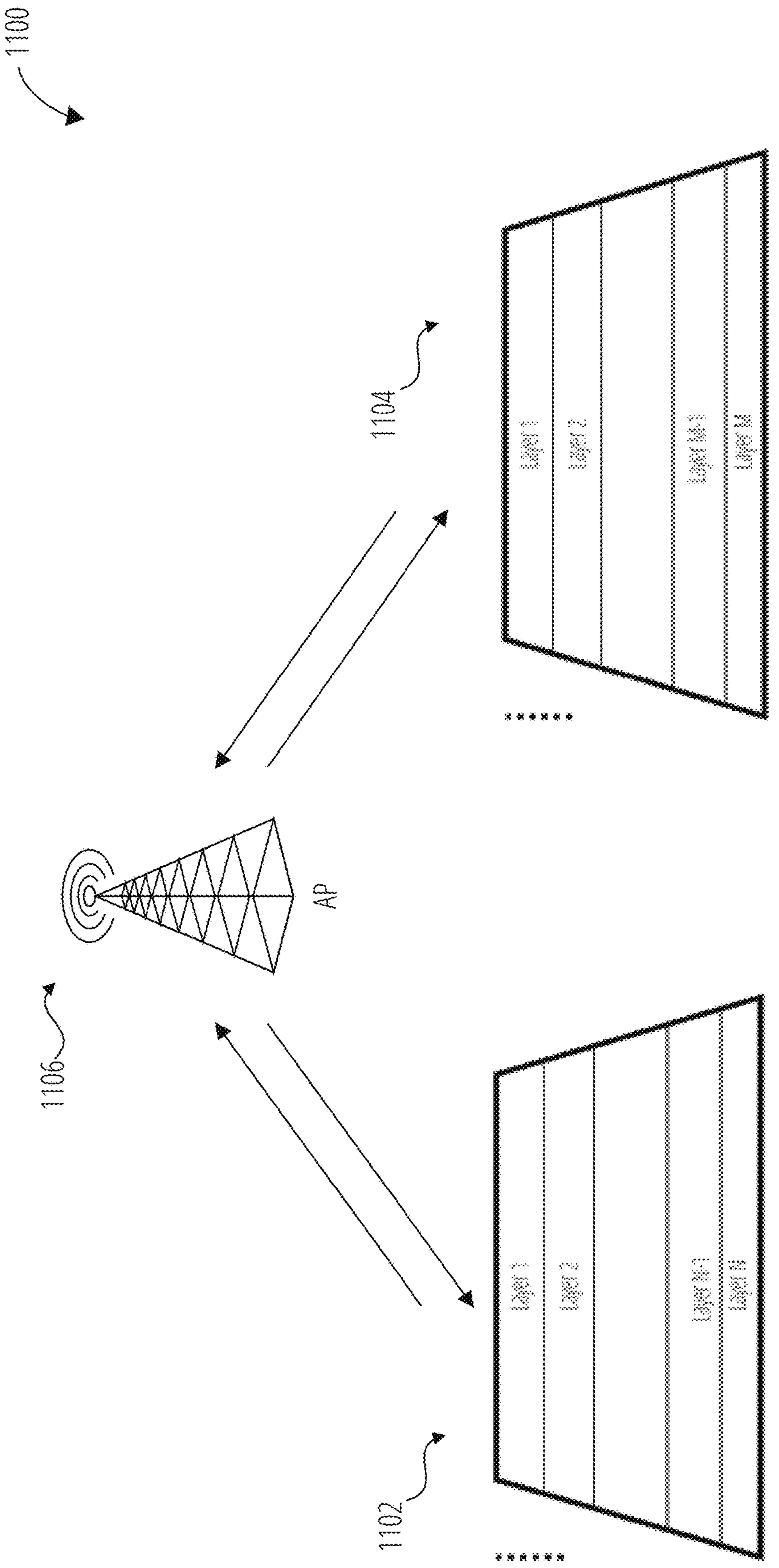
FIG. 11 illustrates a block diagram of a wireless communication system in accordance with some embodiments.

FIG. 11 illustrates a block diagram of a wireless communication system 1100 in accordance with some embodiments. Federated learning is a machine learning technique that allows multiple devices to collaborate in a distributed manner to train a model without the need to transfer data to a central location. In wireless systems, federated learning can be used to improve the performance of wireless networks by leveraging data obtained by a large number of wireless terminals (e.g., UE 1102 and UE 1104).

For instance, a communication process in federated learning may use the following steps. A global model may be broadcasted from the access point 1106 to the connected users (e.g., UE 1102 and UE 1104). The UEs may train the model locally using their own data. The UEs may send their trained models to the access point 1106. The access point 1106 may forward the received model to a computation node for model aggregation. The steps may be repeated until the model converges.

This procedure of federated learning in a wireless communication system 1100 presents some challenges. A first challenge for federated learning is the use of heterogeneous devices. Wireless networks consist of devices with different capabilities, power, and computing resources. Federated learning algorithms may take these differences into account while aggregating models. Similarly, federated learning algorithms have the challenge of handling heterogeneous data. Data generated by wireless devices is non-independent and identically distributed (non-i.i.d). This can impact the convergence of the model training. Additionally, there may be communication constraints. Wireless systems may be limited by communication bandwidth, latency, and energy. Federated learning algorithms may minimize communication between devices to avoid overwhelming the network. Another challenge involves security and privacy. Wireless networks generate a large amount of sensitive data, and federated learning algorithms should attempt to ensure that this data is protected. Additionally, federated learning may be vulnerable to attacks such as poisoning and model inversion, which may compromise the privacy and security of the system.

Figure 12:
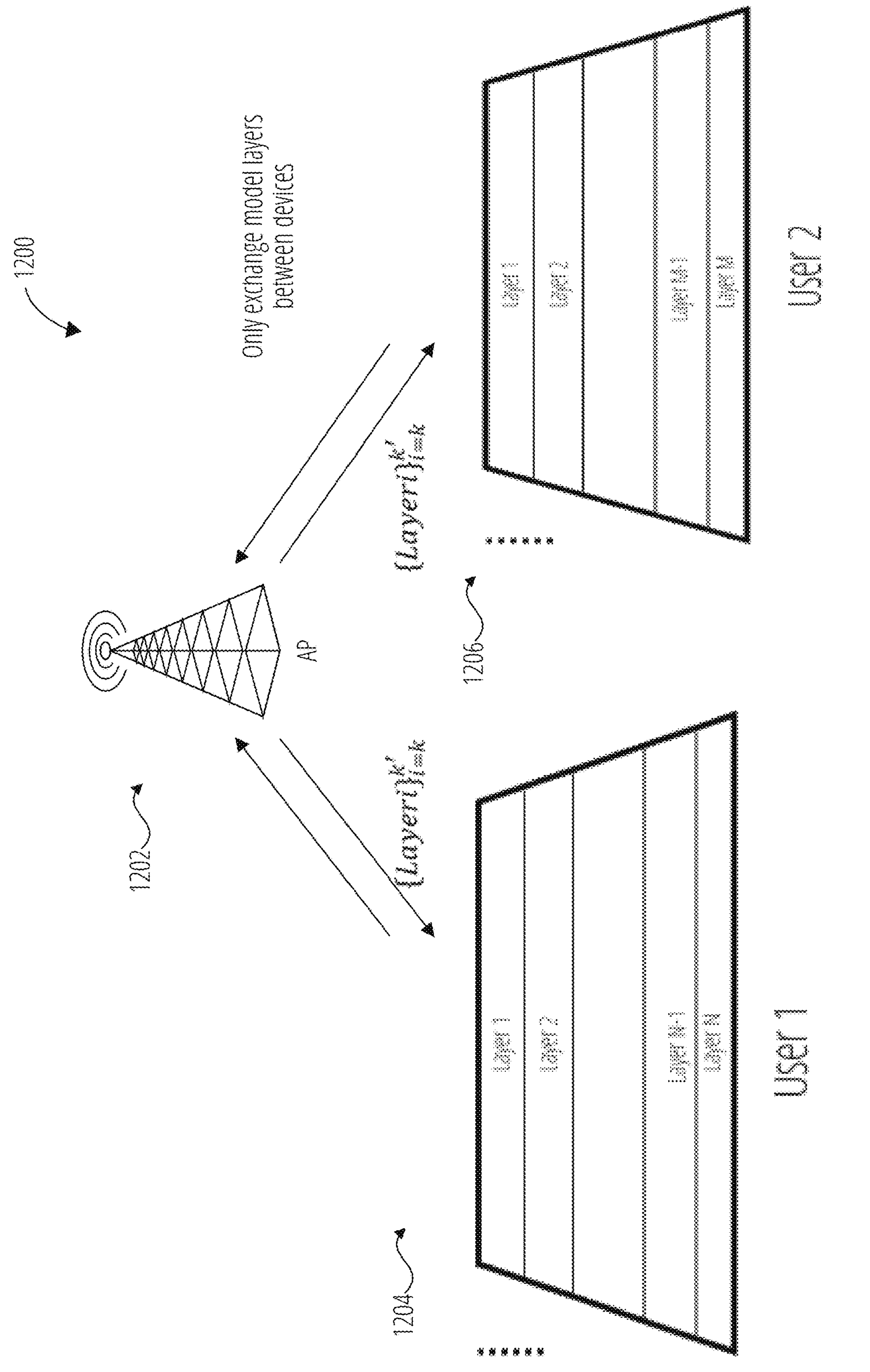
FIG. 12 illustrates a block diagram of a wireless communication system with federated learning by forward-forward learning in accordance with some embodiments.

In some embodiments, forward-forward learning may be introduced to federated learning systems to solve these challenges. FIG. 12 illustrates a block diagram of a wireless communication system 1200 with federated learning by forward-forward learning. Instead of exchanging a whole model, the use of the forward-forward learning may allow the system to exchange model layers between devices. The access point 1202 may provide the UEs (e.g., UE 1204 and UE 1206) with initialization parameters for terminal models. The training at the UE may be performed by forward-forward learning layer-by-layer. The layer models may be sent by the UE's to the access point 1202 which may perform aggregation on a select number of layers. The process may be repeated until the model converges.

Figure 13:
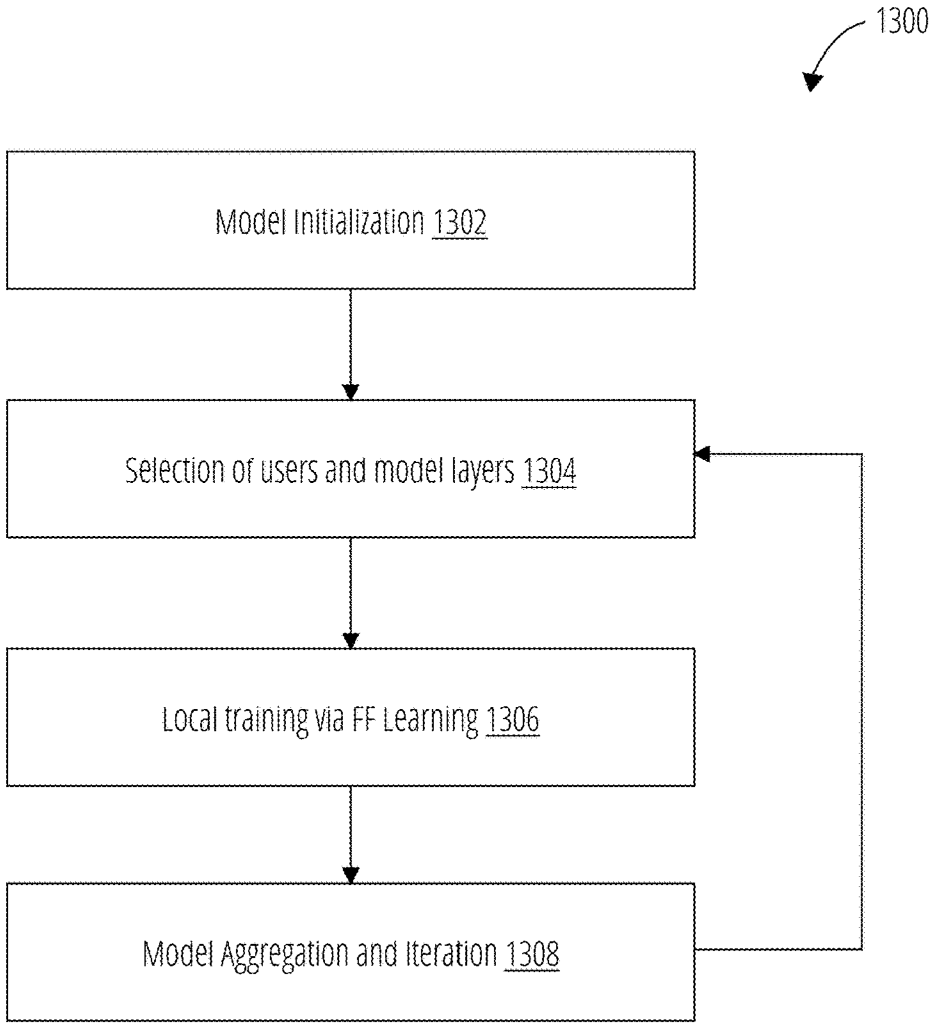
FIG. 13 illustrates a flow chart of a method for a wireless communication system to implement federated learning by forward-forward learning in accordance with some embodiments.

For instance, FIG. 13 illustrates a flow chart of a method 1300 for a wireless communication system to implement federated learning by forward-forward learning in accordance with some embodiments. The method 1300 provides a proposed training procedure with four steps for a wireless communication enabled federated learning system.

The illustrated method 1300 includes model initialization. Every terminal model (e.g., UEs) may be initialized 1302 with some parameters. The parameters may be random, pre-trained, obtained from the access point (e.g., network node). The method further includes selecting 1304 UEs and model layers. A subset of users and their model layers are selected to participate in the training process. In some embodiments, an access point may perform the selection. The UEs may be selected based on their availability, reliability, or randomly. The layers may be selected based on UEs' own criteria, such as computational resources.

An access point may select the UEs for federated learning, inform the UEs of the selection, and instruct the selected UE devices to select one or more model layers to participate in the federated training;

The method 1300 further includes local training 1306 via forward-forward learning. Each UE may train the model using its own data. The training may performed by forward-forward learning in a layer-by-layer manner. For example, the training may use the techniques discussed elsewhere herein.

The method 1300 further includes model aggregation and iteration 1308. The UEs may send the local models to an access point for aggregation to generate a global model. The local models from the selected UEs may be aggregated by an access point to obtain a global model. In some embodiments, the aggregation can be performed on a few layers of the model through averaging. Then, the method 1300 may iteratively repeat the process from the UE and layer selection (e.g., select 1304) until the model converges.

In some embodiments, to conduct the training and aggregation, the models defined on any two devices do not have to be at the same size which is compatible with the heterogeneity of devices and data in federated learning. When a UE has a larger dataset than other UEs, it can be configured with more neural network layers to capture more features from the data. When a UE has less training/inference power, it can be accordingly configured with a smaller number of layers which leads to inferior learning contribution to the entire model.

Because of the layer-by-layer approach, the model/gradient exchange may no longer need to be on the entire model. The number of layers to exchange can be flexibly configured based on communication resources (e.g., bandwidth, latency, and energy).

The privacy and security concerns on each user's data may be automatically addressed since the shared information may be only based on UEs' partial layers. In some embodiments, the raw data is not directly sent to the aggregator. Further, the UEs' entire models are not directly sent to the aggregator which can avoid their dataset distribution to be eavesdropped.

Some embodiments herein propose a set of novel forward-forward algorithm based procedures that are applicable to wireless systems in the context of end-to-end learning and federated learning. To this end, the model training and inference can be conducted more efficiently.

In some embodiments, methods and procedures may use end-to-end learning. In some embodiments, the proposed end-to-end learning framework may use zero memory to store gradients for cross-layer training. In some embodiments, the proposed end-to-end learning framework may not have gradient vanishing/exploding issues for trainable communication systems with deep structures. In some embodiments, training may be done without using the model based knowledge of the wireless channel.

In some embodiments, methods and procedures that utilize forward-forward federated learning may result in saving bandwidth in the communication of model parameters, reducing the training complexity at each user, and improving the privacy of user data.

In some embodiments, model aggregation is a layer-wise operation. In some embodiments, the layer-aggregation can be homogeneous or heterogeneous, where homogeneous aggregation means averaging the neural network coefficients on the same layer among all users, the heterogeneous aggregation means on different layers. In some embodiments, the determination of how many layers for the aggregation from each UE can be based on UE side, such as their available computational resources, transmission bandwidth, battery power, model evaluation errors, or local dataset size, etc; or on network side such as a networks nodes scheduler. In some embodiments, the user data privacy is enhanced by only sending partial layers of its neural network. In some embodiments, a set of layers can be chosen for training at each UE, where the first layer from the set determines the amount of training, i.e., if it is closer to the input, more training is required and vice versa, since the subsequent layers need to be trained.

Figure 14:
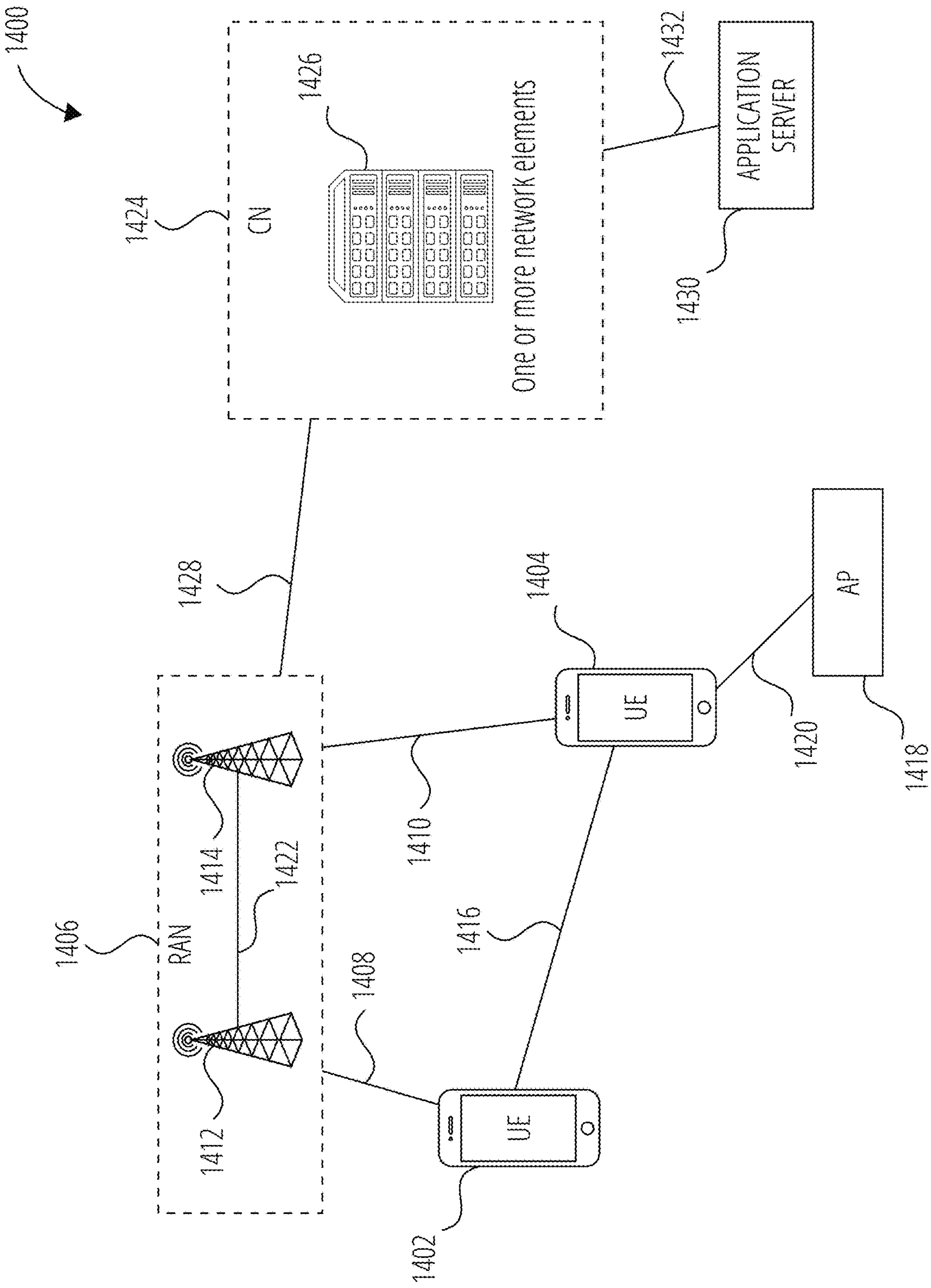
FIG. 14 illustrates an example architecture of a wireless communication system, according to embodiments disclosed herein.

FIG. 14 illustrates an example architecture of a wireless communication system 1400, according to embodiments disclosed herein. The following description is provided for an example wireless communication system 1400 that operates in conjunction with the LTE system standards and/or 5G or NR system standards as provided by 3 GPP technical specifications.

As shown by FIG. 14, the wireless communication system 1400 includes UE 1402 and UE 1404 (although any number of UEs may be used). In this example, the UE 1402 and the UE 1404 are illustrated as smartphones (e.g., handheld touchscreen mobile computing devices connectable to one or more cellular networks), but may also comprise any mobile or non-mobile computing device configured for wireless communication.

The UE 1402 and UE 1404 may be configured to communicatively couple with a RAN 1406. In embodiments, the RAN 1406 may be NG-RAN, E-UTRAN, etc. The UE 1402 and UE 1404 utilize connections (or channels) (shown as connection 1408 and connection 1410, respectively) with the RAN 1406, each of which comprises a physical communications interface. The RAN 1406 can include one or more base stations (such as base station 1412 and base station 1414) that enable the connection 1408 and connection 1410.

In this example, the connection 1408 and connection 1410 are air interfaces to enable such communicative coupling, and may be consistent with RAT(s) used by the RAN 1406, such as, for example, an LTE and/or NR.

In some embodiments, the UE 1402 and UE 1404 may also directly exchange communication data via a sidelink interface 1416. The UE 1404 is shown to be configured to access an access point (shown as AP 1418) via connection 1420. By way of example, the connection 1420 can comprise a local wireless connection, such as a connection consistent with any IEEE 802.11 protocol, wherein the AP 1418 may comprise a Wi-Fi® router. In this example, the AP 1418 may be connected to another network (for example, the Internet) without going through a CN 1424.

In embodiments, the UE 1402 and UE 1404 can be configured to communicate using orthogonal frequency division multiplexing (OFDM) communication signals with each other or with the base station 1412 and/or the base station 1414 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 1412 or base station 1414 may be implemented as one or more software entities running on server computers as part of a virtual network. In addition, or in other embodiments, the base station 1412 or base station 1414 may be configured to communicate with one another via interface 1422. In embodiments where the wireless communication system 1400 is an LTE system (e.g., when the CN 1424 is an EPC), the interface 1422 may be an X2 interface. The X2 interface may be defined between two or more base stations (e.g., two or more eNBs and the like) that connect to an EPC, and/or between two eNBs connecting to the EPC. In embodiments where the wireless communication system 1400 is an NR system (e.g., when CN 1424 is a 5GC), the interface 1422 may be an Xn interface. The Xn interface is defined between two or more base stations (e.g., two or more gNBs and the like) that connect to 5GC, between a base station 1412 (e.g., a gNB) connecting to 5GC and an eNB, and/or between two eNBs connecting to 5GC (e.g., CN 1424).

The RAN 1406 is shown to be communicatively coupled to the CN 1424. The CN 1424 may comprise one or more network elements 1426, which are configured to offer various data and telecommunications services to customers/subscribers (e.g., users of UE 1402 and UE 1404) who are connected to the CN 1424 via the RAN 1406. The components of the CN 1424 may be implemented in one physical device or separate physical devices including components to read and execute instructions from a machine-readable or computer-readable medium (e.g., a non-transitory machine-readable storage medium).

In embodiments, the CN 1424 may be an EPC, and the RAN 1406 may be connected with the CN 1424 via an S1 interface 1428. In embodiments, the S1 interface 1428 may be split into two parts, an S1 user plane (S1-U) interface, which carries traffic data between the base station 1412 or base station 1414 and a serving gateway (S-GW), and the S1-MME interface, which is a signaling interface between the base station 1412 or base station 1414 and mobility management entities (MMEs).

In embodiments, the CN 1424 may be a 5GC, and the RAN 1406 may be connected with the CN 1424 via an NG interface 1428. In embodiments, the NG interface 1428 may be split into two parts, an NG user plane (NG-U) interface, which carries traffic data between the base station 1412 or base station 1414 and a user plane function (UPF), and the S1 control plane (NG-C) interface, which is a signaling interface between the base station 1412 or base station 1414 and access and mobility management functions (AMFs).

Generally, an application server 1430 may be an element offering applications that use internet protocol (IP) bearer resources with the CN 1424 (e.g., packet switched data services). The application server 1430 can also be configured to support one or more communication services (e.g., VoIP sessions, group communication sessions, etc.) for the UE 1402 and UE 1404 via the CN 1424. The application server 1430 may communicate with the CN 1424 through an IP communications interface 1432.

Figure 15:
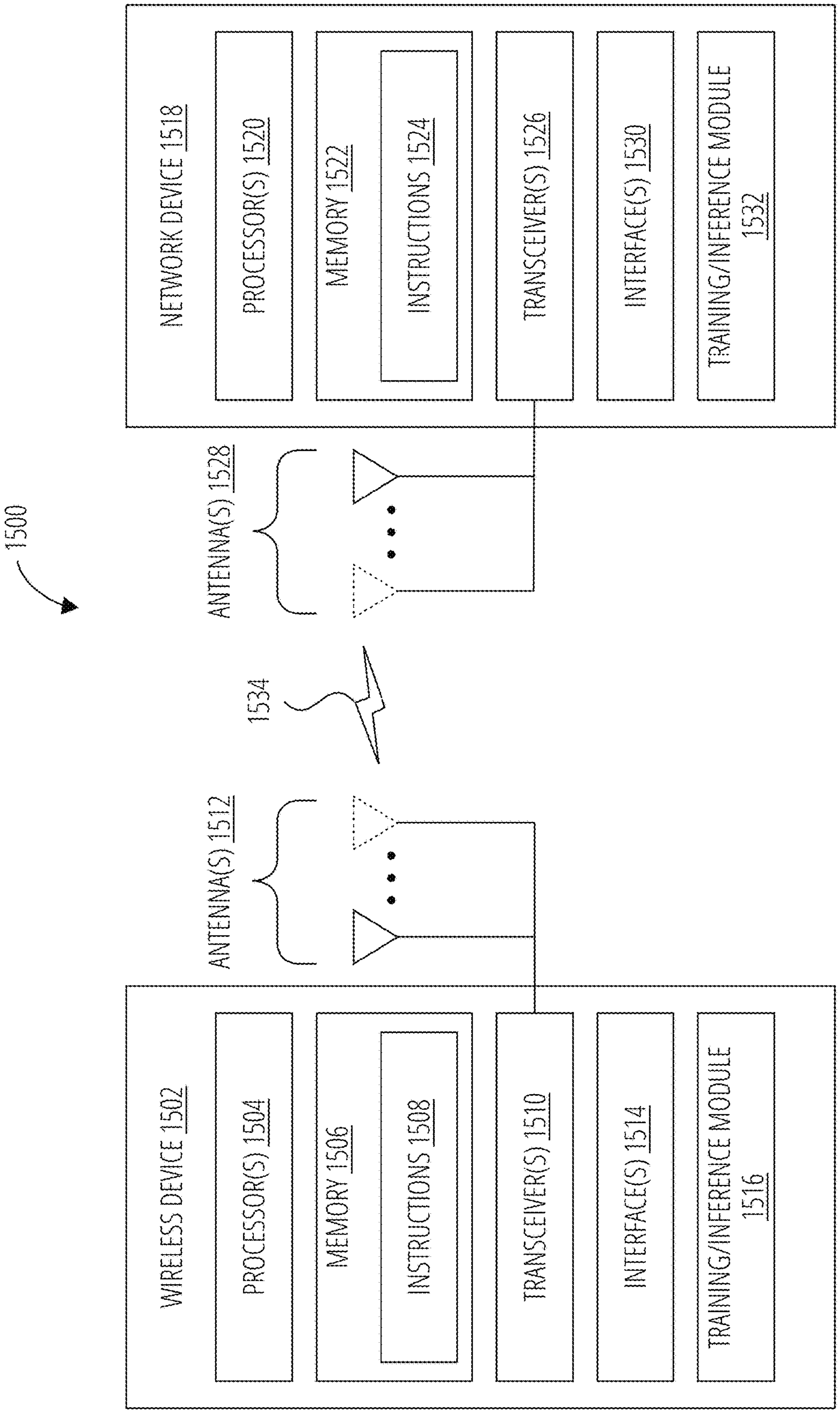
FIG. 15 illustrates a system for performing signaling between a wireless device and a network device, according to embodiments disclosed herein.

FIG. 15 illustrates a system 1500 for performing signaling 1534 between a wireless device 1502 and a network device 1518, according to embodiments disclosed herein. The system 1500 may be a portion of a wireless communications system as herein described. The wireless device 1502 may be, for example, a UE of a wireless communication system. The network device 1518 may be, for example, a base station (e.g., an eNB or a gNB) of a wireless communication system.

The wireless device 1502 may include one or more processor(s) 1504. The processor(s) 1504 may execute instructions such that various operations of the wireless device 1502 are performed, as described herein. The processor(s) 1504 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1502 may include a memory 1506. The memory 1506 may be a non-transitory computer-readable storage medium that stores instructions 1508 (which may include, for example, the instructions being executed by the processor(s) 1504). The instructions 1508 may also be referred to as program code or a computer program. The memory 1506 may also store data used by, and results computed by, the processor(s) 1504.

The wireless device 1502 may include one or more transceiver(s) 1510 that may include radio frequency (RF) transmitter circuitry and/or receiver circuitry that use the antenna(s) 1512 of the wireless device 1502 to facilitate signaling (e.g., the signaling 1534) to and/or from the wireless device 1502 with other devices (e.g., the network device 1518) according to corresponding RATs.

The wireless device 1502 may include one or more antenna(s) 1512 (e.g., one, two, four, or more). For embodiments with multiple antenna(s) 1512, the wireless device 1502 may leverage the spatial diversity of such multiple antenna(s) 1512 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1502 may be accomplished according to precoding (or digital beamforming) that is applied at the wireless device 1502 that multiplexes the data streams across the antenna(s) 1512 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1502 may implement analog beamforming techniques, whereby phases of the signals sent by the antenna(s) 1512 are relatively adjusted such that the (joint) transmission of the antenna(s) 1512 can be directed (this is sometimes referred to as beam steering).

The wireless device 1502 may include one or more interface(s) 1514. The interface(s) 1514 may be used to provide input to or output from the wireless device 1502. For example, a wireless device 1502 that is a UE may include interface(s) 1514 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1510/antenna(s) 1512 already described) that allow for communication between the UE and other devices and may operate according to known protocols (e.g., Wi-Fi®, Bluetooth®, and the like).

The wireless device 1502 may include a training/inference module 1516. The training/inference module 1516 may be implemented via hardware, software, or combinations thereof. For example, the training/inference module 1516 may be implemented as a processor, circuit, and/or instructions 1508 stored in the memory 1506 and executed by the processor(s) 1504. In some examples, the training/inference module 1516 may be integrated within the processor(s) 1504 and/or the transceiver(s) 1510. For example, the training/inference module 1516 may be implemented by a combination of software components (e.g., executed by a DSP or a general processor) and hardware components (e.g., logic gates and circuitry) within the processor(s) 1504 or the transceiver(s) 1510.

The training/inference module 1516 may be used for various aspects of the present disclosure, for example, aspects of FIGS. 1-14. The training/inference module 1516 is configured to train the goodness functions of each layer of the wireless device 1502 and use the goodness functions to make inferences to determine values of signals sent from the network device 1518. Additionally, the training/inference module 1516 may perform functions of federated learning.

The network device 1518 may include one or more processor(s) 1520. The processor(s) 1520 may execute instructions such that various operations of the network device 1518 are performed, as described herein. The processor(s) 1520 may include one or more baseband processors implemented using, for example, a CPU, a DSP, an ASIC, a controller, an FPGA device, another hardware device, a firmware device, or any combination thereof configured to perform the operations described herein.

The network device 1518 may include a memory 1522. The memory 1522 may be a non-transitory computer-readable storage medium that stores instructions 1524 (which may include, for example, the instructions being executed by the processor(s) 1520). The instructions 1524 may also be referred to as program code or a computer program. The memory 1522 may also store data used by, and results computed by, the processor(s) 1520.

The network device 1518 may include one or more transceiver(s) 1526 that may include RF transmitter circuitry and/or receiver circuitry that use the antenna(s) 1528 of the network device 1518 to facilitate signaling (e.g., the signaling 1534) to and/or from the network device 1518 with other devices (e.g., the wireless device 1502) according to corresponding RATs.

The network device 1518 may include one or more antenna(s) 1528 (e.g., one, two, four, or more). In embodiments having multiple antenna(s) 1528, the network device 1518 may perform MIMO, digital beamforming, analog beamforming, beam steering, etc., as has been described.

The network device 1518 may include one or more interface(s) 1530. The interface(s) 1530 may be used to provide input to or output from the network device 1518. For example, a network device 1518 that is a base station may include interface(s) 1530 made up of transmitters, receivers, and other circuitry (e.g., other than the transceiver(s) 1526/antenna(s) 1528 already described) that enables the base station to communicate with other equipment in a core network, and/or that enables the base station to communicate with external networks, computers, databases, and the like for purposes of operations, administration, and maintenance of the base station or other equipment operably connected thereto.

The network device 1518 may include a training/inference module 1532. The training/inference module 1532 may be implemented via hardware, software, or combinations thereof. For example, the training/inference module 1532 may be implemented as a processor, circuit, and/or instructions 1524 stored in the memory 1522 and executed by the processor(s) 1520. In some examples, the training/inference module 1532 may be integrated within the processor(s) 1520 and/or the transceiver(s) 1526. For example, the training/inference module 1532 may be implemented by a combination of software components (e.g., executed by a DSP or a general processor) and hardware components (e.g., logic gates and circuitry) within the processor(s) 1520 or the transceiver(s) 1526.

The training/inference module 1532 may be used for various aspects of the present disclosure, for example, aspects of FIGS. 1-14. The training/inference module 1532 is configured to train the goodness functions of each layer of the network device 1518 and use the goodness functions to make inferences to determine values of signals sent from the wireless device 1502. Additionally, the training/inference module 1532 may perform functions of federated learning.

Embodiments contemplated herein include an apparatus comprising means to perform one or more elements of method 600, method 800, and method 1300. This apparatus may be, for example, an apparatus of a UE (such as a wireless device 1502 that is a UE, as described herein).

Embodiments contemplated herein include one or more non-transitory computer-readable media comprising instructions to cause an electronic device, upon execution of the instructions by one or more processors of the electronic device, to perform one or more elements of method 600, method 800, and method 1300. This non-transitory computer-readable media may be, for example, a memory of a UE (such as a memory 1506 of a wireless device 1502 that is a UE, as described herein).

Embodiments contemplated herein include an apparatus comprising logic, modules, or circuitry to perform one or more elements of method 600, method 800, and method 1300. This apparatus may be, for example, an apparatus of a UE (such as a wireless device 1502 that is a UE, as described herein).

Embodiments contemplated herein include an apparatus comprising: one or more processors and one or more computer-readable media comprising instructions that, when executed by the one or more processors, cause the one or more processors to perform one or more elements of method 600, method 800, and method 1300. This apparatus may be, for example, an apparatus of a UE (such as a wireless device 1502 that is a UE, as described herein).

Embodiments contemplated herein include a signal as described in or related to one or more elements of method 600, method 800, and method 1300.

Embodiments contemplated herein include a computer program or computer program product comprising instructions, wherein execution of the program by a processor is to cause the processor to carry out one or more elements of method 600, method 800, and method 1300. The processor may be a processor of a UE (such as a processor(s) 1504 of a wireless device 1502 that is a UE, as described herein). These instructions may be, for example, located in the processor and/or on a memory of the UE (such as a memory 1506 of a wireless device 1502 that is a UE, as described herein).

Embodiments contemplated herein include an apparatus comprising means to perform one or more elements of the method 600, method 800, and method 1300. This apparatus may be, for example, an apparatus of a base station (such as a network device 1518 that is a base station, as described herein).

Embodiments contemplated herein include one or more non-transitory computer-readable media comprising instructions to cause an electronic device, upon execution of the instructions by one or more processors of the electronic device, to perform one or more elements of the method 600, method 800, and method 1300. This non-transitory computer-readable media may be, for example, a memory of a base station (such as a memory 1522 of a network device 1518 that is a base station, as described herein).

Embodiments contemplated herein include an apparatus comprising logic, modules, or circuitry to perform one or more elements of method 600, method 800, and method 1300. This apparatus may be, for example, an apparatus of a base station (such as a network device 1518 that is a base station, as described herein).

Embodiments contemplated herein include an apparatus comprising: one or more processors and one or more computer-readable media comprising instructions that, when executed by the one or more processors, cause the one or more processors to perform one or more elements of method 600, method 800, and method 1300. This apparatus may be, for example, an apparatus of a base station (such as a network device 1518 that is a base station, as described herein).

Embodiments contemplated herein include a signal as described in or related to one or more elements of method 600, method 800, and method 1300.

Embodiments contemplated herein include a computer program or computer program product comprising instructions, wherein execution of the program by a processing element is to cause the processing element to carry out one or more elements of the method 600, method 800, and method 1300. The processor may be a processor of a base station (such as a processor(s) 1520 of a network device 1518 that is a base station, as described herein). These instructions may be, for example, located in the processor and/or on a memory of the base station (such as a memory 1522 of a network device 1518 that is a base station, as described herein).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for federated learning for a wireless communication system, the method comprising:

initializing parameters of models for user equipment (UE) devices;

selecting, via a network node, two or more of the UE devices as selected UE devices to participate in federated training;

selecting, at the selected UE devices, one or more model layers as selected model layers to participate in the federated training;

performing, at the selected UE devices, forward-forward learning on the selected model layers to generate local models for the selected model layers of the selected UE devices;

aggregating, at the network node, the local models to generate a global model; and iteratively selecting the two or more of the UE devices, selecting the one or more of the model layers, performing the forward-forward learning on the selected model layers, and aggregating the local models until the global model converges.

2. The method for federated learning of claim 1, wherein the parameters are initialized with values that are random, pre-trained, or obtained from the network node.

3. The method for federated learning of claim 1, wherein the UE devices are selected based on their availability, their reliability, or randomly.

4. The method for federated learning of claim 1, wherein the one or more model layers are selected based on criteria determined by each of the selected UE devices, wherein a number of the one or more model layers selected by the selected UE devices is based on available computational resources, transmission bandwidth, battery power, model evaluation errors, or local dataset size.

5. The method for federated learning of claim 1, wherein the aggregating is performed by averaging layers.

6. The method for federated learning of claim 1, wherein the aggregating of the local models is a layer-wise operation.

7. The method for federated learning of claim 1, wherein an aggregation of the selected model layers is homogeneous or heterogeneous, wherein homogeneous aggregation comprises averaging neural network coefficients on a same layer among all of the UE devices, and wherein heterogeneous aggregation comprises averaging neural network coefficients on different layers.

8. The method for federated learning of claim 1, wherein each of the two or more selected UE devices chooses a set of layers for the federated training, wherein a first layer from the set of layers determines an amount of training.

9. The method for federated learning of claim 1, wherein the local models that the UE devices send include partial layers of a neural network.

10. A network node apparatus comprising:

a processor; and a memory storing instructions that, when executed by the processor, configure the apparatus to:

initialize parameters of models for user equipment (UE) devices;

select two or more of the UE devices as selected UE devices to participate in federated training;

instruct the selected UE devices to select one or more model layers as selected model layers to participate in the federated training;

receive local models generated by the selected UE devices performing forward-forward learning on the selected model layers; and aggregate, at the network node apparatus, the local models to generate a global model.

11. The network node apparatus of claim 10, wherein the parameters are initialized with values that are random, pre-trained, or obtained from the network node.

12. The network node apparatus of claim 10, wherein the UE devices are selected based on their availability, their reliability, or randomly.

13. The network node apparatus of claim 10, wherein the aggregating is performed by averaging layers.

14. The network node apparatus of claim 10, wherein the aggregating of the local models is a layer-wise operation.

15. The network node apparatus of claim 10, wherein the selected model layers aggregation are homogeneous or heterogeneous, wherein homogeneous aggregation comprises averaging neural network coefficients on a same layer among all UE devices, and wherein heterogeneous aggregation comprises averaging neural network coefficients on different layers.

16. The network node apparatus of claim 10, wherein the local models that the UE devices send include partial layers of a neural network.

17. A user equipment (UE) apparatus comprising:
a processor; and
a memory storing instructions that, when executed by the processor, configure the apparatus to:
initialize parameters of models for the UE apparatus;
receive an indication from a network node that the UE apparatus is selected to participate in a federated training;
select one or more model layers as selected model layers to participate in the federated training;
perform forward-forward learning on the selected model layers to generate local models for the selected model layers; and
send the local models to the network node for aggregation to generate a global model.

18. The UE apparatus of claim 17, wherein the parameters are initialized with values that are random, pre-trained, or obtained from the network node.

19. The UE apparatus of claim 17, wherein the UE apparatus is selected based on its availability, its reliability, or randomly.

20. The UE apparatus of claim 17, wherein the one or more model layers are selected based on criteria determined by the UE apparatus, wherein a number of the one or more model layers selected by the UE apparatus is based on available computational resources, transmission bandwidth, battery power, model evaluation errors, or local dataset size.

* * * * *